Nov. 2, 1937. R. A. COLE 2,097,784
CALIPERING APPARATUS
Filed May 21, 1936
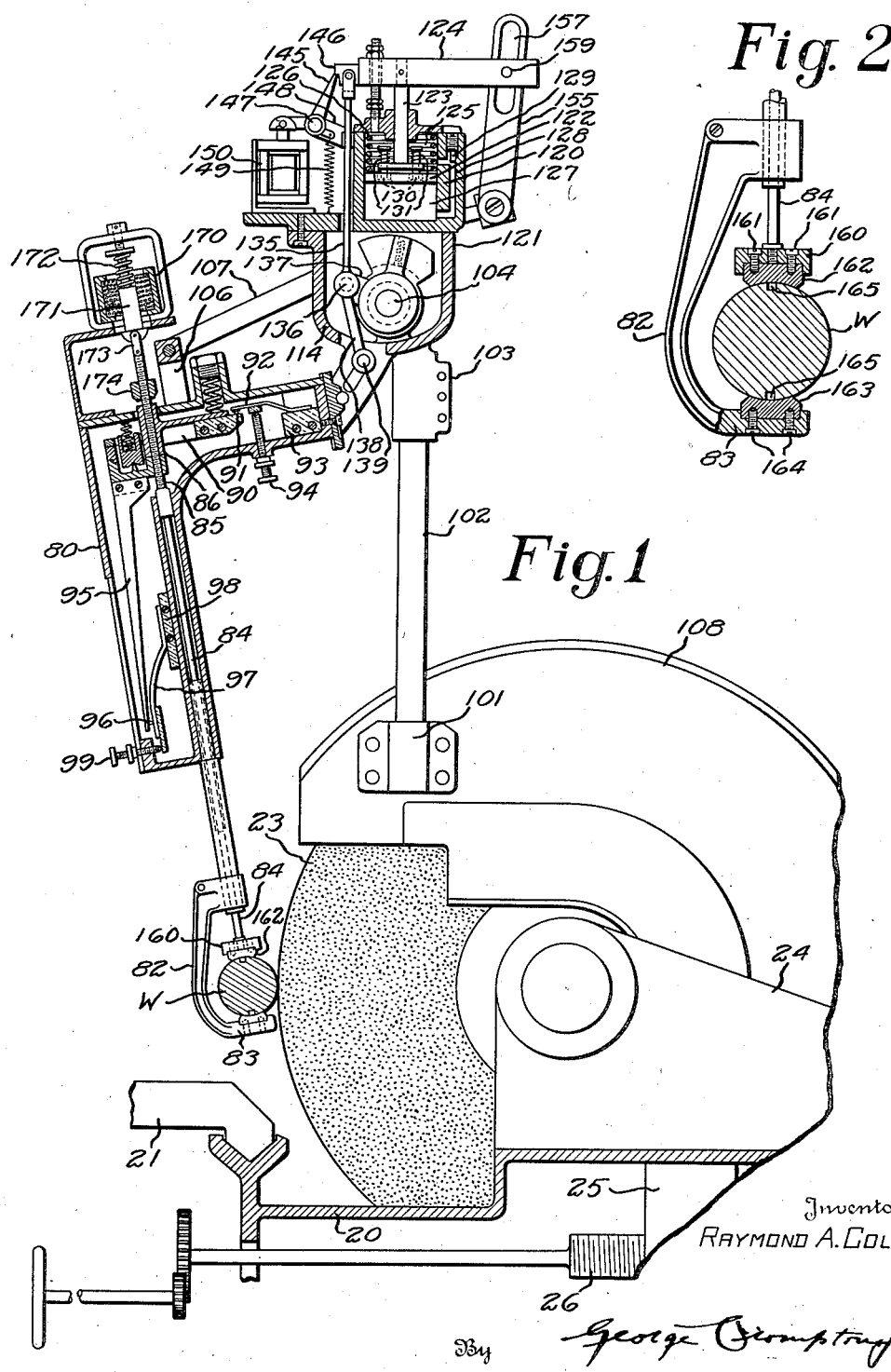

Patented Nov. 2, 1937

2,097,784

UNITED STATES PATENT OFFICE 2,097,784

CALIPERING APPARATUS

Raymond A. Cole, Worcester, Mass., assignor to Norton Company, Worcester, Mass., a corporation of Massachusetts Application May 21, 1936, Serial No. 80,949

1 Claim. (Cl. 51—165)

The invention relates to grinding machines and to a calipering apparatus therefor, and with regard to its more specific features to a calipering apparatus to control the size of a splined shaft or the like which is being ground on a cylindrical grinding machine, and to control the operation of such a cylindrical grinding machine.

One object of the invention is to provide a calipering apparatus for splined shafts and other discontinuous surface of revolution work pieces. Another object of the invention is to provide a calipering apparatus for noncircular work pieces. Another object of the invention is to improve the apparatus of patent to Albert G. Belden and myself, No. 2,003,334, so that it shall be adapted to control the grinding of splined shafts and the like. Another object of the invention is to provide a mechanism automatically to separate the gaging elements of a calipering apparatus. Another object of the invention is to cause gaging elements to remove themselves from contact with a work piece when the work piece comes to desired size. Other objects will be in part obvious or in part pointed out hereinafter.

The invention accordingly consists in the features of construction, combinations of elements, arrangements of parts, as will be exemplified in the structure to be hereinafter described, and the scope of the application of which will be indicated in the following claim.

In the accompanying drawing illustrating one of many possible embodiments of the mechanical features of this invention, Figure 1 is a vertical sectional view of the caliper head, timing control switch and associated parts mounted on the wheel guard, this view also illustrating certain elements of the cross feed.

Figure 2 is an enlarged fragmentary detailed view of the gages.

For a clearer understanding of the present invention reference should be made to the aforesaid Patent No. 2,003,334. I provide a grinding machine having a base 20 a fragment of which is shown in Figure 1, the grinding machine having a table or carriage 21 supported thereon for longitudinal or reciprocatory motion parallel to the axis of a rotatable grinding wheel 23 which is supported upon a wheel slide 24 for movement at right angles to the axis of the grinding wheel in order to produce the desired grinding action. The wheel slide 24 may be fed towards or from the work by any suitable feeding mechanism, for example one having a half nut 25 depending from the slide 24 and a feed screw 26 which is rotatably mounted in the base of the machine.

The feed screw may be actuated and controlled by the mechanism disclosed in the aforesaid patent.

I provide a calipering box 80 containing a slidable feeler rod 84 opposing the end 83 of a C-shaped calipering head 82. The work piece W is located between the portion 83 and the feeler 84 and is contacted by arcuate work engaging shoes which will be more particularly described hereinafter. The feeler 84 is slidably mounted within the head 80 and engaged at its upper end by a micrometer screw 85 threaded into a bell crank lever 86 which is pivoted as described in the aforesaid patent. A short arm 90 of the bell crank lever is provided with a contact 91 positioned to engage contact member 92 which is fixed within the head 80 and insulated therefrom by the block 93. A suitable adjusting screw 94 is provided to adjust the position of the contact member 92 relative to the head 80. A long arm 95 of the bell crank lever 86 is provided with a contact member 96 arranged to engage a contact member 97 which is fixed to the head 80 and insulated therefrom by a block 98. A suitable adjusting screw 99 is provided to adjust the contact member 97 so as to vary the point of making and breaking of the contact members.

The caliper box 80 is preferably supported on a fixed part of the machine and as illustrated is supported on the wheel guard 108 by means of a bracket 101 having a vertically extending post 102. A bracket 103 is supported on the upper end of the post 102 and in turn supports a cross-shaft 104 which serves as a support for the calipering head. The upper end of the box 80 is provided with a supporting bracket 106 which is pivotally connected to one end of a rod 107. The rod 107 is mounted on a bracket, not shown, pivotally mounted on the shaft 104. A clock spring, disclosed in the aforesaid patent, having one end fixed to the shaft 104 and the other end fixed to a stud on the bracket exerts a pressure tending to hold the size finder or caliper head in an upper or inoperative position.

When the head 80 is in an operative position the clock spring serves to exert an upward pressure upon the calipering head 82 so that the gage or head is held in contact with the surface of the work as it is reduced in size.

Timing control

To attain various objects of this invention, a suitable timing or time delay device is provided which serves, after a rough grinding operation has been completed, to cause the grinding wheel to grind the work for a finishing operation for a predetermined time interval. This timing mechanism is controlled by a member which moves in response to a reduction in size of the work so that when a definite work size has been indicated, the time delay mechanism will be brought into operation. This may be so arranged that the grinding wheel may be fed rapidly into the work for a rough grinding operation until a feeler contacting with the work indicates a predetermined size, whereupon the delay mechanism starts into operation and, after a definite time interval, the feeding mechanism may be reversed to separate the wheel and work and stop the grinding operation. In the preferred construction, the parts are so arranged that the feeler operates through an electrical mechanism and serves to cause the forward feed of the wheel into the work to be stopped and permit a dying-out and finish grinding operation to be effected. When the feeler mechanism indicates a second predetermined, smaller work size, then the time delay mechanism is set into operation to permit the dying-out cut to carry on through a predetermined time interval, after which the reversing mechanism separates the wheel and work. Also, in the preferred construction, the feeler is automatically removed from contact with the work prior to the end of the grinding operation permitted by the time delay mechanism. In the preferred construction, an electrically controlled dash-pot mechanism comprising a dash-pot cylinder 120 is supported on a housing 121 which is in turn supported on the shaft 104. A dash-pot piston 122 is slidably mounted within the cylinder 120 and fixedly connected by a piston rod 123 with a cross arm 124. The piston is urged in a downward direction by means of a compression spring 125 within an upper chamber 126. Oil within a lower chamber 127 is forced through a passage 128, through a needle valve 129 and into the chamber 126. By regulating the aperture of the valve 129, the speed of the downward movement of the dash-pot piston 122 may be regulated. The return or upward movement of the piston 122 is facilitated by a pair of check valves 130 which are normally held in a closed position by springs 131, the tension of the springs 131 being only sufficient to maintain the valves normally in a closed position. As the piston is moved upwardly, the oil is forced downwardly through the valve 130 and may also pass back through the needle valve 129 and passage 128 into the lower chamber 127. The cross arm 124 is connected by a link 135 to a stud 136 on a rock arm 137 which is rotatably mounted on the shaft 104. The rock arm 137 is connected by a link 138 to a stud 139 on an arcuate slide, not shown, which is integral with the box 80.

A latch or pawl 145 is provided to engage a notch 146 in the cross arm 124 to maintain the dash pot latched in its uppermost position. The pawl 145 is pivotally mounted on a stud 147 which is in turn supported on a bracket 148 extending from the cylinder 120 and is held in a latched position by means of a spring 149. An electric solenoid 150 is operatively connected to trip the pawl 145, when it is energized. A link 155 is connected to an end 156 of a rod 107 and is provided with an elongated slot 157 at its upper end, engaging a stud 159 on the cross arm 124. The relative motions of the parts described are fully explained in the patent referred to and need not be repeated herein.

Referring now to Figure 2, according to the present invention mounted upon the lower end of the feeler rod 84 is a block 160 to which is attached as by means of screws 161 an arcuate calipering block 162. Similarly attached to the opposite end 83 of the calipering head 82 is an arcuate calipering block 163, which is screwed to the end 83 by means of screws 164. Either block 162 or 163 may readily be removed and replaced with one having an arcuate contact surface of different curvature.

By reason of the broad contact which the arcuate surfaces of the calipering blocks maintain with the work piece W, calipering is not interfered with by reason of splines 165 or other breaks in the surface of the work piece W.

The control and cycle of machine operation according to the present invention is or may be the same as that disclosed in the aforesaid Patent No. 2,003,334. According to the disclosure in said patent, the gage head 82 is swung, first downwardly and then arcuately away from the work piece W. I provide additional mechanism to separate the calipering or gaging blocks 162 and 163 upon removal of the gage head 82 from the work piece, in order that the arcuate calipering blocks may clear the work piece as they leave it.

Referring now to Figure 1, I provide a solenoid 170 which is in circuit with the solenoid 150 preferably in parallel therewith and is operated coincidentally therewith by electric operating circuits and devices as set forth in the patent. The solenoid plunger 171 of this solenoid is spring urged by means of a spring 172 in a downward direction, and the core 171 is connected by a link 173 to the screw 85. A nut 174 acts as an adjustable stop. When the solenoid 170 is energized, the calipering block 162 is raised. In so much as, however, the action of the apparatus as explained in the patent when the latch 145 is tripped causes the calipering head 82 to be moved downwardly, the effect is to remove both blocks 162 and 163 from the work piece W, thus creating ample clearance between them and the work piece despite their arcuate configuration. The calipering box 80 then swings upwardly carrying with it the calipering head 82 and parts thereof all as described in the aforesaid patent.

It will thus be seen that there has been provided by this invention an apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

A grinding machine comprising a rotatable grinding wheel and a work support which are movable relatively towards and from each other, a feeding mechanism to cause such relative movement, a gauging device including a work engaging feeler having an arcuate work contacting portion arranged continuously to engage the work during grinding, which device controls said feeding mechanism, means actuated by movement of said feeler as the work is reduced in size to move said gauging device away from the work when the work has been ground to a predetermined size moving said device in a direction substantially that of a segment of the arcuate portion of the feeler, and further means acting substantially simultaneously with said last named means to move the arcuate work engaging feeler in a direction substantially radial of said arcuate contacting portion.

RAYMOND A. COLE.